(12) United States Patent
Moon et al.

(10) Patent No.: US 9,281,722 B2
(45) Date of Patent: Mar. 8, 2016

(54) INTERIOR PERMANENT MAGNET SYNCHRONOUS MOTOR

(71) Applicant: Hyundai Motor Company, Seoul (KR)

(72) Inventors: Sang Hoon Moon, Gyeonggi-do (KR); Kyoung Bum Kim, Gyeonggi-do (KR); Myung Gyu Kim, Seoul (KR); Ki Nam Kim, Gyeonggi-do (KR); Hyoung Jun Cho, Seoul (KR); Yeon Ho Kim, Gyeonggi-do (KR); Jung Shik Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 376 days.

(21) Appl. No.: 13/829,537

(22) Filed: Mar. 14, 2013

(65) Prior Publication Data

US 2014/0159530 A1  Jun. 12, 2014

(30) Foreign Application Priority Data

Dec. 11, 2012  (KR) ........................ 10-2012-0143349

(51) Int. Cl.
*H02K 1/27*  (2006.01)
*H02K 1/28*  (2006.01)
*H02K 29/03*  (2006.01)

(52) U.S. Cl.
CPC .................. *H02K 1/27* (2013.01); *H02K 1/276* (2013.01); *H02K 1/2766* (2013.01); *H02K 1/28* (2013.01); *H02K 29/03* (2013.01); *Y02T 10/641* (2013.01)

(58) Field of Classification Search
CPC ....... H02K 1/27; H02K 1/276; H02K 1/2766; H02K 1/28; H02K 29/03; Y02T 10/641; Y10T 29/49012

USPC ............ 310/156.08, 156.11, 156.12, 156.46, 310/156.53, 156.56
IPC ................................................ H02K 1/27,1/28
See application file for complete search history.

(56) References Cited

U.S. PATENT DOCUMENTS

| | | | | |
|---|---|---|---|---|
| 5,650,680 | A * | 7/1997 | Chula | H02K 1/276 310/111 |
| 5,783,890 | A * | 7/1998 | Mulgrave | 310/156.43 |
| 7,839,045 | B2 | 11/2010 | Wu et al. | |
| 8,179,010 | B2 * | 5/2012 | Ogami | H02K 1/2766 29/598 |
| 8,829,753 | B2 * | 9/2014 | Maruyama | H02K 1/278 310/156.08 |
| 2010/0001606 | A1 * | 1/2010 | Ogami et al. | 310/156.53 |
| 2011/0001382 | A1 * | 1/2011 | Leonardi et al. | 310/156.53 |
| 2012/0091845 | A1 * | 4/2012 | Takemoto | H02K 1/276 310/156.01 |
| 2012/0112592 | A1 * | 5/2012 | Yamada | H02K 1/2746 310/156.53 |
| 2014/0159530 | A1 * | 6/2014 | Moon et al. | 310/156.11 |

FOREIGN PATENT DOCUMENTS

| | | |
|---|---|---|
| JP | 2012-050189 A | 3/2012 |
| KR | 10-2011-0026162 | 3/2011 |
| KR | 10-2011-0026162 A | 3/2011 |

OTHER PUBLICATIONS

"The Magnetic Field of a Permanent Magnet", Experiment #31 from Physics, Vernier Software & Technology Co., 2015.*

* cited by examiner

*Primary Examiner* — John K Kim
(74) *Attorney, Agent, or Firm* — Mintz Levin Cohn Ferris Glovsky and Popeo, P.C.; Peter F. Corless

(57) ABSTRACT

An interior permanent magnet synchronous motor is provided. In the motor, a V-type recess is provided between adjacent permanent magnets within an outer surface of a rotor. The angle of the V-type recess ranges from 103° to 107°.

3 Claims, 5 Drawing Sheets

INTERIOR PERMANENT MAGNET SYNCHRONOUS MOTOR

CROSS-REFERENCE TO RELATED APPLICATION

This application claims under 35 U.S.C. §119(a) the benefit of Korean Patent Application No. 10-2012-0143349 filed Dec. 11, 2012, the entire contents of which are incorporated herein by reference.

BACKGROUND

1. Field of the Invention

The present invention relates, in general, to an electric motor in which a permanent magnet is embedded into a rotor, and more particularly, to an interior permanent magnet synchronous motor in which a feature of a V-type recess formed in the rotor is improved so as to significantly reduce torque ripple and resultant noise at a low speed.

2. Description of the Related Art

Recently, due to the growing concern regarding the overuse of fossil fuels, high efficiency, high performance electric devices have been receiving much attention. Among them, eco-friendly vehicles such as electric cars, hybrid electric cars, and the like have been developed for the purpose of reducing gas emission. For use in such eco-friendly vehicles, an interior permanent magnet synchronous motor is typically used and consistent attention is given to improving their overall cost and operation. The structure of such an interior permanent magnet synchronous motor is such that a permanent magnet is embedded into a rotor. Such motors require high torque and low torque ripple, and are provided by systematic, optimized designs.

However, in such a conventional interior type motor, torque ripple at low speed causes high frequency noise to be generated, degrading quality of a product. Thus, there is a need for a structure in which, upon regenerative braking at a low speed, torque ripple is reduced so as to reduce noise.

As a solution to this problem, a rotor for a hybrid driving motor has been provided. In this motor, an annular body is arranged inside a stator having a core around which a power feeding coil is wound. A permanent magnet unit is embedded into the annular body and has a pair of separate left and right permanent magnets, and a U-type sectional groove is recessed into a portion of the annular body in which the pair of permanent magnets are not embedded. However, this technique does not reduce high frequency noise caused by torque ripple at a low speed in the motor, and thus there is still a need to provide a motor that reduces high frequency noise.

The description regarding the related art is provided only for understanding of the background of the invention, so it should not be construed by ordinarily skilled persons in the art to be admitted to be the related art.

SUMMARY

Accordingly, the present invention has been made keeping in mind the above problems occurring in the related art, and the present invention is intended to provide an interior permanent magnet synchronous motor in which a V-type recess is formed in a rotor to significantly reduce torque ripple and resultant noise at low speeds.

In order to achieve the above object, according to one aspect of the present invention, there is provided an interior permanent magnet synchronous motor in which a V-type recess is provided on an outer surface of a rotor, between adjacent permanent magnets provided in the rotor. More specifically, the angle of the V-type recess may range from 103° to 107°.

In some exemplary embodiments of the present invention, the recess may be formed in the outer surface of the rotor toward an inside (toward the center) thereof, and the depth of the recess may be 4.5~4.7% of an outer diameter of the rotor. Furthermore, the permanent magnets may be sequentially arranged in a row in the rotor.

Also, the permanent magnets may be provided so as to have 8 dipoles of N and S poles so that a total number of the N and S poles is 16. The recess may have a round end at a deepest disposition, and the round end may have a radius of curvature ranging from 0.3 mm to 1 mm.

As a result of the V type recess the overall operation of the motor is improved, thereby considerably reducing the torque ripple and resultant noise at a low speed. Particularly, noise in the $48^{th}$ harmonic content (i.e., the main content of the torque ripple of the motor) can be considerably reduced.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
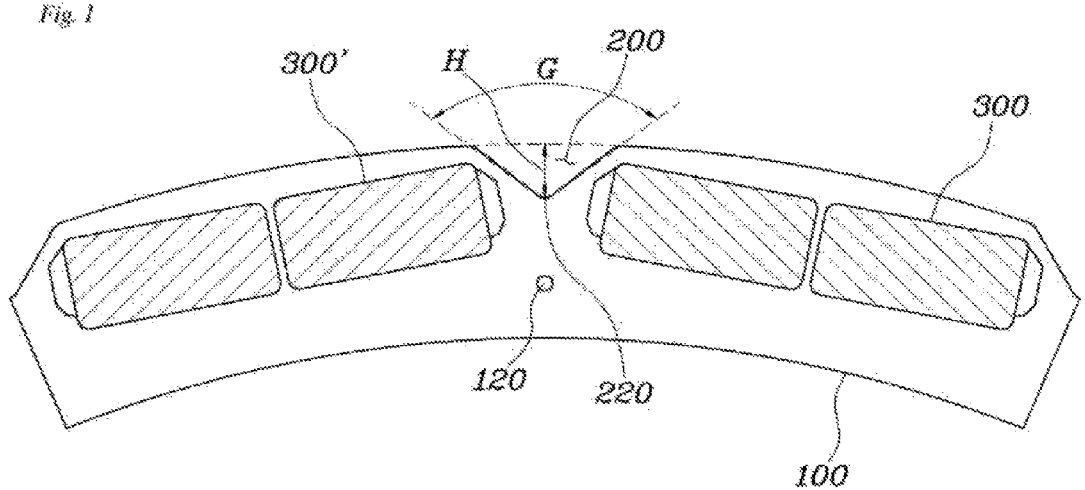
FIG. 1 is a view illustrating an interior permanent magnet synchronous motor according to an exemplary embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

FIG. 1 is a view illustrating an interior permanent magnet synchronous motor according to an exemplary embodiment of the present invention. The interior permanent magnet synchronous motor is provided, in which a V-type recess 200 is provided on an outer surface of a rotor 100 between adjacent permanent magnets 300 and 300' provided in the rotor. More specifically, the V-type recess 200 has an angle that may range from about 103° to 107°. The recess 200 is formed in the outer surface of the rotor 100 toward the inside thereof, and the depth (H) of the recess may be about 4.5~4.7% of an outer diameter of the rotor 100. The permanent magnets in the motor may be sequentially arranged in a row in the rotor such that opposite polarities alternate. Here, the arrangement of the permanent magnets in the rotor 100 may be implemented in a variety of forms.

The present invention is characterized by the outer surface of the rotor 100, particularly the shape of the recess formed in the outer surface. This is because characteristics of torque ripple and resultant noise are diversified according the shape of the recess. In particular, the rotor is composed of a plurality of steel plates which are stacked in the form of the illustrated sectional shape, and a detailed description thereof will be omitted.

As shown in the figure, the interior permanent magnet synchronous motor is configured such that the permanent magnets are sequentially arranged in a row in the rotor, with the adjacent permanent magnets 300 and 300' spaced apart by a certain distance, such that the N and S polarities of the respective magnets alternate, and such that the V-type recess 200 which is recessed into the outer surface toward the inside (center) of the rotor is formed between the permanent magnets in between the poles thereof.

The shape of the V-type recess 200 can be defined by the angle and the depth of the recess. The angle (G) preferably ranges from about 103° to 107°. This is because, if the angle is out of that range, the torque ripple becomes greater and thus the resultant noise is further increased. Particularly, high frequency noise that a person hears at a low speed range can be bothersome to most users, and the high frequency noise may be considerably reduced if the angle of the recess is limited to the range.

Also, the depth (H) of the recess ranges from about 4.5% to 4.7% with respect to an outer diameter of the rotor. If the depth exceeds this range, torque ripple and resultant noise at a low speed increase. Particularly, since an embossed section 120 is additionally formed in the rotor in the proximity of the deepest end of the recess in order to precisely stack the steel plate for the rotor, the recess is formed out of the place where the embossed section is formed.

In the meantime, in an embodiment, the serial arrangement of the permanent magnets 300 in the rotor 100 is such that 8 dipoles of N and S poles are provided so that a total number of the N and S poles is 16. Further, the deepest end 220 of the recess 200 is formed to be round, and in an embodiment, the round end 220 of the recess 200 may preferably have a radius of curvature ranging from 0.3 mm to 1 mm. As described above, since the embossed section is additionally formed in the rotor in the proximity of the deepest end of the recess in order to precisely stack the steel plate for the rotor, the recess is formed out of the place when the embossed section is formed.

Figure 2:
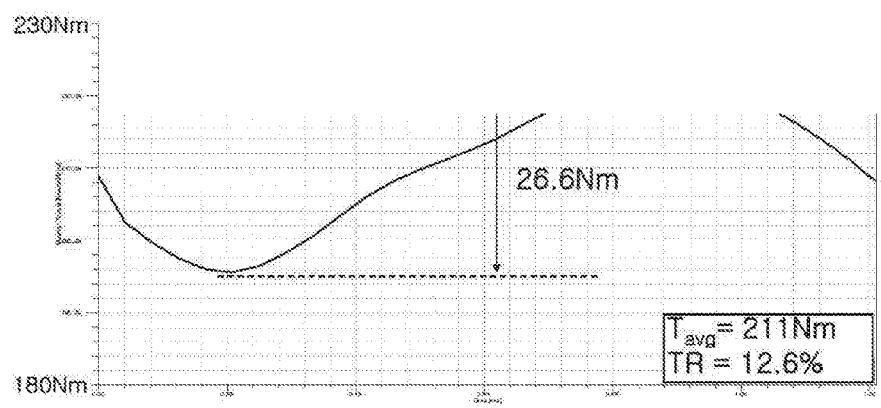
FIGS. 2 and 3 are graphs illustrating a difference in torque ripples of the interior permanent magnet synchronous motor of the embodiment and a motor in the related art.
Figure 3:
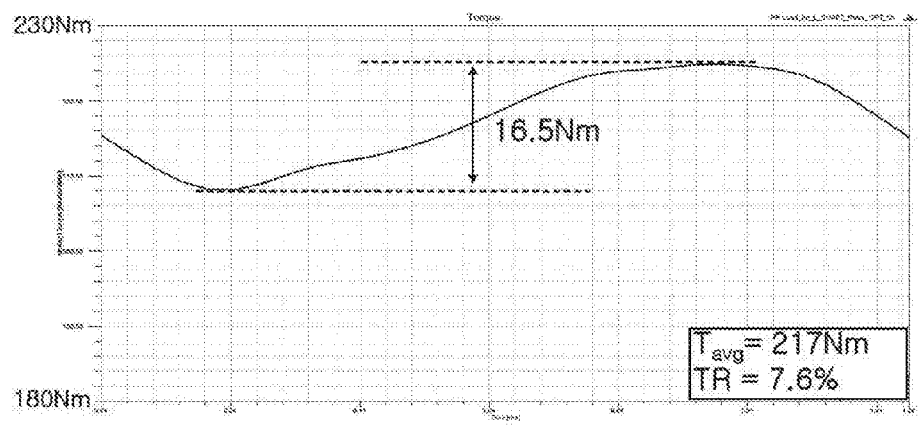

FIGS. 2 and 3 are graphs illustrating a difference in torque ripples of the interior permanent magnet synchronous motor of the exemplary embodiment and a motor in the related art. FIG. 2 shows the motor of the related art in which the recess has an angle of 108° or more, which is greater than in the present invention, and a depth of 4.4% or less of the outer diameter of the rotor, which is smaller than in the present invention. FIG. 3 shows the motor of the present invention in which the recess has an angle of 105° and a depth of 4.6% of the outer diameter of the rotor. Further, the deepest end of the recess is round with a radius of curvature of 0.8 mm.

As compared with the case of the related art shown in FIG. 2, it can be seen that, in the motor of the present invention, maximum torque is increased from about 211 NM to 217 NM, and the torque ripple is reduced from about 26.6 NM and 12.6% to 16.5 NM and 7.6%.

Figure 4:
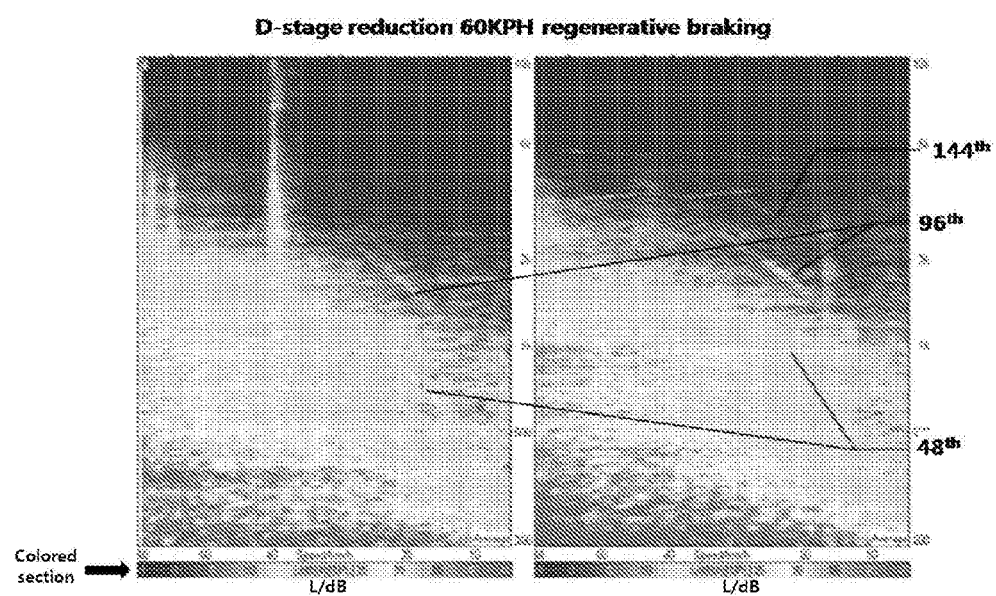
FIGS. 4 and 5 are graphs illustrating a difference in noises of the interior permanent magnet synchronous motor of the exemplary embodiment and a motor in the related art.
Figure 5:
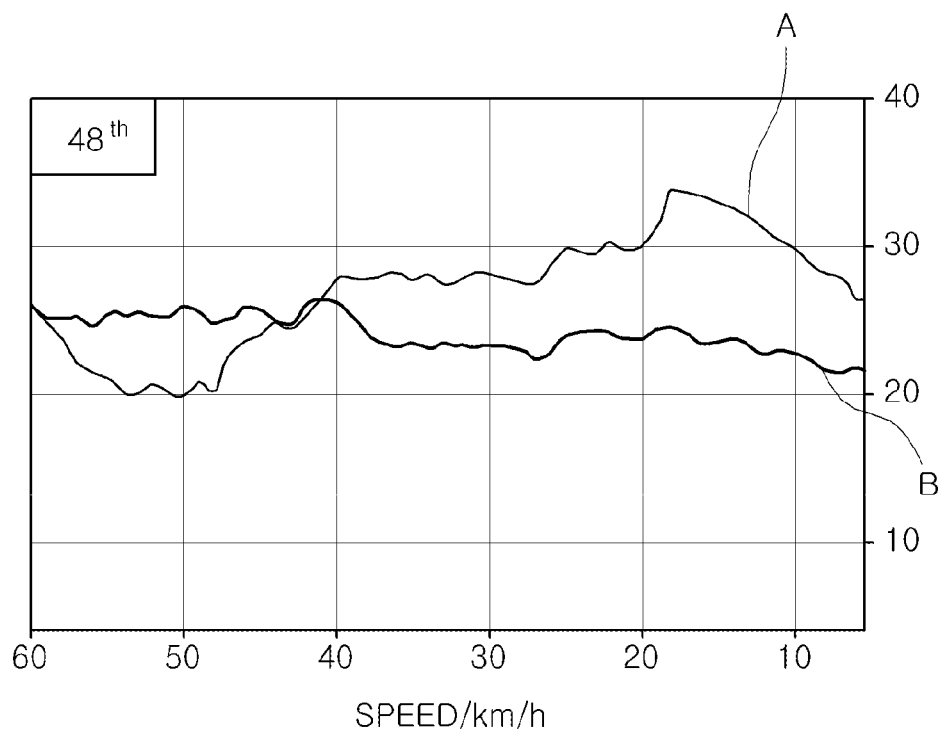
Figure 6:
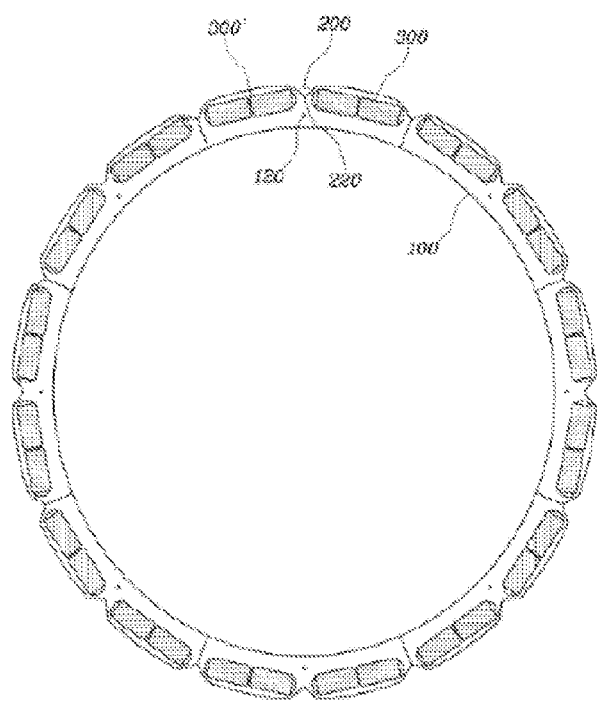
FIG. 6 is a view illustrating sequentially arranged permanent magnets in the interior permanent magnet synchronous motor according to the exemplary embodiment of the present invention.

FIGS. 4 and 5 are graphs illustrating a difference in noises of the interior permanent magnet synchronous motor of the exemplary embodiment and a motor in the related art. In FIG. 4, the horizontal axis represents speed (Km/h) and the vertical axis represents frequency of a harmonic wave. A colored section shows the degree of noise (L/dB). The motors are tested in such a manner that the respective motors are mounted in a hybrid vehicle, and are tested by performing regenerative braking from 60 km/h.

As can be seen from the graphs, noise is considerably reduced at the $48^{th}$ harmonic wave. As is generally known in the art with respect to noise, in the case of a 3-phase motor, the fundamental content is a factor of 6 times the number of dipoles. Thus, in the case of the present embodiment having 8 dipoles, the fundamental content thereof becomes the $48^{th}$ harmonic wave that is 6 times the 8 dipoles. It can be known that the present embodiment has noise at the $48^{th}$ harmonic content which is considerably reduced relative to the related art.

FIG. 5 is a detailed graph in which only the $48^{th}$ harmonic content is shown in detail, wherein the horizontal axis represents speed and the vertical axis represents the degree of noise. As can be seen from the graph, it can be known that the case (B) of the present invention has considerably reduced noise relative to the case (A) of the related art.

The motors were tested in such a manner that the respective motors were mounted in a hybrid vehicle, and were tested by performing regenerative braking from 60 km/h. In the test, noise was considerably reduced at a low speed. Generally, in a case of a vehicle, at a high speed, high frequency noise was reduced and is not heard owing to road noise of a tire, wind noise, or engine noise, and the extraneous noise at a low speed, particularly during regenerative braking, is very small and thus high frequency noise was greatly reduced.

According to an interior permanent magnet synchronous motor having the structure as described as such, the V-type recess improves the operation of the motor, thereby considerably reducing the torque ripple at low speed and resultant noise. Particularly, noise in the $48^{th}$ harmonic content that is the main content of the torque ripple of the motor can be considerably reduced.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. An interior permanent magnet synchronous motor embedded into rotor comprising:
  the rotor including a V-type recess in an outer surface of the rotor between adjacent permanent magnets in the rotor, wherein the V-type recess has an angle that ranges from about 103° to 107°, the V-type recess is formed in the outer surface of the rotor toward an inside thereof, a depth of the V-type recess is about 4.5~4.7% of an outer diameter of the rotor, the V-type recess has a round end at a deepest position thereof, and the round end has a radius of curvature ranging from about 0.3 mm to 1 mm.

2. The interior permanent magnet synchronous motor according to claim 1, wherein the permanent magnets are sequentially arranged in a row within the rotor.

3. The interior permanent magnet synchronous motor according to claim 2, wherein the permanent magnets are provided so as to have 8 dipoles of N and S poles so that a total number of the N and S poles is 16.

* * * * *